United States Patent [19]

Speranza et al.

[11] Patent Number: 4,904,751

[45] Date of Patent: * Feb. 27, 1990

[54] N,N'-DIALKYL SUBSTITUTED POLYOXYALKLENE AMINES AS CURING AGENTS FOR BLOCKED ISOCYANATES

[75] Inventors: George P. Speranza, Austin; Jiang-Jen Lin, Round Rock; Michael Cuscurida, Austin, all of Tex.

[73] Assignee: Texaco Chemical Company, White Plains, N.Y.

[*] Notice: The portion of the term of this patent subsequent to Aug. 30, 2005 has been disclaimed.

[21] Appl. No.: 135,951

[22] Filed: Dec. 21, 1987

[51] Int. Cl.$^4$ ............................................. C08G 18/81
[52] U.S. Cl. ........................................................ 528/45
[58] Field of Search ............................................. 528/45

[56] References Cited

U.S. PATENT DOCUMENTS

| | | | |
|---|---|---|---|
| 4,031,050 | 6/1977 | Jerabek | 528/45 |
| 4,134,866 | 1/1979 | Tominaga et al. | 528/45 |
| 4,163,815 | 8/1979 | Cheung | 528/45 |
| 4,274,989 | 6/1981 | Tominaga et al. | 528/45 |
| 4,340,712 | 7/1982 | Reichmann et al. | 528/45 |
| 4,374,031 | 2/1983 | Kudo et al. | 528/45 |
| 4,452,963 | 6/1984 | Moriarity | 528/45 |
| 4,465,858 | 8/1984 | Cuscunida et al. | 564/477 |
| 4,490,520 | 12/1984 | Ogasa et al. | 528/315 |
| 4,491,663 | 1/1985 | Kondomenos et al. | 544/193 |
| 4,495,229 | 1/1985 | Wolf et al. | 427/388.2 |
| 4,590,009 | 5/1986 | Pampouchidis et al. | 560/332 |
| 4,590,254 | 5/1986 | Chang et al. | 528/49 |
| 4,596,842 | 6/1986 | Chung et al. | 528/45 |
| 4,624,996 | 11/1986 | Risk et al. | 525/453 |
| 4,742,118 | 5/1988 | Parekh | 528/45 |
| 4,767,836 | 8/1988 | Cuscurida et al. | 528/45 |

FOREIGN PATENT DOCUMENTS 2151643A 7/1985 United Kingdom .

OTHER PUBLICATIONS

"Blocked Isocyanates in Coatings," by Patten et al.

Primary Examiner—John Kight
Assistant Examiner—Dennis R. Daley
Attorney, Agent, or Firm—Jack H. Park; Kenneth R. Priem

[57] ABSTRACT

A polyurethane coating composition is disclosed which may be heat cured under relatively mild conditions. The composition comprises a chemically blocked isocyanate and a curing agent comprising an N,N'-dialkyl substituted polyoxyalkylene amine.

6 Claims, No Drawings

N,N'-DIALKYL SUBSTITUTED POLYOXYALKLENE AMINES AS CURING AGENTS FOR BLOCKED ISOCYANATES

BACKGROUND OF THE INVENTION

1. Field of the Invention

This invention relates to the use of certain amines for curing blocked polyisocyanates especially in a coating composition.

2. Related Art in the Field

Blocked polyisocyanates are used to make one component coating systems which should be storage stable at room temperature. A mixture of a polyisocyanate and an active hydrogen containing compound is only stable in storage at room temperature and is only workable to form a coating if the reactive isocyanate groups are blocked and are, therefore, unable to react. When heat is applied, the blocking agents must of course split off and the isocyanate react with the active hydrogen containing material to form the cured polyurethane coating.

The blocking of polyisocyanates is a procedure which is well known for the temporary retardation of the reaction between the isocyanate groups and an active hydrogen containing compound. The literature notes various blocking agents; for example, tertiary alcohols, phenols, acetoacetic ester, ethyl malonate, and others. Various methods of blocking and unblocking isocyanates are revealed in the prior art, including the following patents and publications.

U. S. Pat. Nos. 4,495,229; 4,624,996; 4,590,009; 4,491,663; and U. K. Patent Application GB 2 151 643A. A paper concerning the subject is entitled "Blocked Isocyanates in Coatings," by T. A. Potter, et al (1985). Many of these publications and patents describe the use of amines as well as hydroxyl containing materials to block isocyanates and also describe these same materials as curing agents.

Copending application SN 050,444, filed 5/18/87, now U.S. Pat. No. 4,767,863, describes the use of a partially alkoxylated polyoxyalkylene amine as a curing agent for blocked isocyanates.

SUMMARY OF THE INVENTION

The invention is a polyurethane coating composition which may be heat cured under relatively mild conditions comprising an isocyanate which has been chemically blocked and a curing agent comprising an N,N'-dialkyl substituted polyoxyalkylene amine having 50 to 100% of its amine groups substituted to secondary amines. The invention is also a method for curing a blocked isocyanate with a curing agent as described above.

DETAILED DESCRIPTION OF THE PREFERRED EMBODIMENTS

According to the present invention, a polyurethane one component heat curable coating is made of a mixture of blocked isocyanate and a curing agent which is an N,N'-dialkyl substituted polyoxyalkylene amine. These materials are made by the reaction of a polyoxyalkylene amine, acetone and/or methyl ethyl ketone and hydrogen in the presence of a hydrogenation catalyst. These curing agents form more stable blocked isocyanates and coatings and improved properties when compared with those which utilize the precursor polyoxyalkylene amines as the curing agent.

Useful polyoxyalkyleneamines ranging in molecular weight from about 200 to 400 with a functionality of from about 2 to 3.

Preferred embodiments include polyoxyalkylene amines having the following formulas:

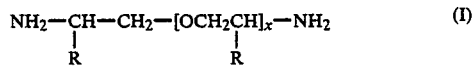

where x is from about 2 to 10, and

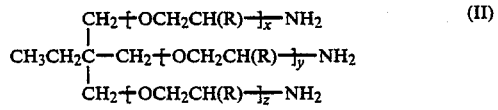

where each R can independently be hydrogen or a lower alkyl group of 1 to 4 carbon atoms, x can range from 1 to 4 and the sum of x, y and z can range from 5.3 to 10. As stated above, the alkylene moiety is preferably ethylene, propylene and 1,2-butylene. Thus R is more preferably hydrogen or an alkyl group of 1 or 2 carbon atoms. Descriptions of these materials are found in U. S. Pat. No. 4,465,858.

These and similar polyoxyalkylene amines are reacted with acetone and/or methyl ethyl ketone and hydrogen in the presence of a hydrogenation catalyst. These reaction products are described in application SN 135,798 now abandoned filed of even date.

Useful hydrogenation catalysts include the nickel, copper, chromium catalyst as described in U. S. Pat. No. 3,654,370 to Yeakey which is incorporated herein by reference. Raney nickel and Raney nickel promoted with molybdenum are also useful hydrogenation catalysts.

An embodiment of the N,N'-dialkyl substituted polyoxyalkylene amines made from polyoxyalkylene amines like (I) above have the general structure:

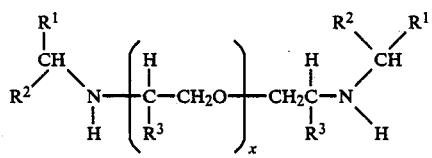

$R^1=CH_3, C_2H_5$; $R^2=CH_3, C_2H_5$; $R^3=H, CH_3$; $x=1-10$ and wherein the degree of substitution ranges from 50 to 100%. 100% substitution is defined as all secondary amines as shown, and 50% is defined as equal numbers of primary and secondary amines.

The following are suitable as initial compounds which may be blocked with the secondary amines according to the present invention: polyisocyanates, especially diisocyanates such as aliphatic, cycloaliphatic, araliphatic, aryl-substituted aliphatic and/or aromatic diisocyanates, as they are described, for example, in Houben-Weyl, "Methods of Organic Chemistry," Volume XIV/2, pages 61-70, and in the article by W. Siefken in "Justus Liebigs Annalen der Chemie" 562, pages 75-136, including such compounds as 1,2-ethylene diisocyanate, 1,4-tetramethylene diisocyanate, 1,6-hexamethylene diisocyanate, 2,2,4- or 2,4,4-trimethyl-1,6-hexamethylene diisocyanate (TMDI), 1,12-dodecane diisocyanate, ω,ω'-diisocyanate dipropylether, cyclobutane-1,3-diisocyanate, cyclohexane-1,3- and 1,4-diisocyanate, 3-isocyanato methyl-3,5,5-trimethylcyclohexyl isocyanate, which is also called isophorone diisocyanate and is also abbreviated as IPDI, decahydro-8-methyl-(1,4-methanonaphthalene-2(or 3)5-ylene dimethylene diisocyanate, decahydro-4,7-methano-inda-1 (or 2) 5 (or 6)-ylene dimethylene diisocyanate, hexahydro-4-7-methane indan-1-(or 2) 5 (or 6)ylene diisocyanate, 2,4- and 2,6-hexahydrotoluene diisocyanate, perhydro-2,4- and 2,6-hexahydrotoluene diisocyanate, perhydro-2,4- and/or 4,4'-diphenyl methane diisocyanate, ω,ω'-diisocyanate-1,4-diethylbenzene, 1,4-phenylene diisocyanate, 4,4'-diisocyanate diphenyl, 4,4'-diisocyanate-3,3'-dichlordiphenyl, 4,4'-diisocyanate-3,3'-dimethoxy diphenyl, 4,4'-diisocyanate-3,3'-dimethyldiphenyl, 4,4'-diisocyanate-3,3'-diphenyl-diphenyl, 4,4'-diisocyanate diphenyl methane, naphthylene-1,5-diisocyanate, toluene diisocyanate, toluene-2,4- or 2,6-diisocyanate, N,N'-(4,4'-dimethyl-3,3'-diisocyanate diphenyl)-uretidione, m-xylylene diisocyanate, but also the triisocyanates such as 2,4,4-triisocyanate diphenyl ether, 4,4',4''-triisocyanate triphenyl methane, tris(4-isocyanate phenyl)-thiophosphate. Additional suitable isocyanates are described in the above mentioned article in the "Annalen" on page 122 ff.

Particularly preferred are the commercially accessible aliphatic, cycloaliphatic and aromatic diisocyanates and especially 3-isocyanatomethyl-3,5,5-trimethyl cyclohexyl isocyanate and toluene diisocyanate and their isomer mixtures.

Useful isocyanates include prepolymers containing active isocyanate groups based on isocyanates set out above and active hydrogen containing materials such as polyols.

The blocking agents useful in my invention are those which are known to practitioners of the art and include: phenol, cresols and long aliphatic chain substituted phenols such as isononylphenol. Also included are amides such as Σ-caprolactam, oximes such as butanoneoxime, active methane group-containing compounds such as malonates and acetoacetates. Sodium bisulfite is also a known blocking agent as is hydrocyanic acid.

Curing temperatures used for products of my invention range from about 80° to 200° C.

The usefulness of my invention will be illustrated by the following examples.

EXAMPLE 1

This example will illustrate the hydrogenation of a triethylene glycol diamine (1) (JEFFAMINE® EDR-148)/acetone mixture to form the N,N'-dialkyl substituted derivative (2).

To a 1-liter stirred autoclave was charged EDR-148 (296g, 2 moles), acetone (174g, 3 moles) and a nickel, copper, chromium catalyst such as defined in U.S. Pat. No. 3,654,370 (25g). The autoclave was sealed and flushed twice with hydrogen. The reactor was pressured to 1000 psi of hydrogen and heated to 180° C. Then, the pressure was raised to 2500 psi and maintained at this pressure with incremental addition of hydrogen until no pressure uptake was noticed. The reaction time was about 5 hrs. The mixture was allowed to cool to room temperature. The Ni, Cu, Cr catalyst was recovered through filtration. The filtrate was distilled to give N-isopropyl triethylene glycol diamine (1) (~90% purity, b.p. 120°–129° C./12 mm Hg, 200g) and N,N'-diisopropyl triethylene glycol diamine, (2) (b.p. 134°–140° C./11 mm Hg, 66.2g)

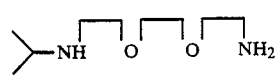  (1)

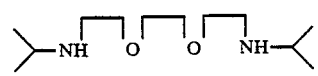  (2)

EXAMPLE 2

This example will show the hydrogenation of a tetraethylene glycol diamine (JEFFAMINE EDR-192)/acetone mixture to form the corresponding N,N'-dialkyl substituted derivative.

The experimental procedures of Example 1 were repeated, except charging EDR-192 (409g, 94%, ~2 moles), acetone (284g, 4.9 moles) and catalyst as in Example 1 (25g). The reaction conditions were 3000 psi H₂ pressure, 180° C. and 4 hrs. The catalyst was recovered by filtration. The product was distilled to give 312g of N,N'-diisopropyl tetraethylene glycol diamine (b.p. 148°–157° C./2.5–3.9 mm Hg). This major product was confirmed by N-nmr to be

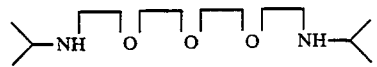

EXAMPLE 3

This example will demonstrate the hydrogenation of a 230 m.w. polyoxypropylene diamine (JEFFAMINE® D-230)/acetone mixture.

The experimental procedures above were repeated with the mixture of JEFFAMINE® D-230 (299g, 1.3 moles), acetone (307g, 5.2 moles) and catalyst as in Example 1 (25g). The conditions were 3000 psi H₂ pressure, 180° C. and ca. 3.5 hrs. The catalyst was recovered by filtration. The light materials were removed by cold-trap under vacuum. The crude product was light colored liquid with amine contents of 6.53 meq/g (calc. 6.4 meq/g) for total amine and 4.03 meq/g for secondary amine. (The product was obtained in the amount of 336g).

EXAMPLE 4

This example will show the hydrogenation of a 400 m.w. polyoxypropylene diamine (JEFFAMINE® D-400)/acetone mixture.

The similar experimental procedures were used except employing JEFFAMINE D-400 (400g, 1.0 mole), acetone (232g, 4.0 meq/g) and catalyst as in Example 1 (25g). The conditions were 3000 psi H₂ pressure, 180° C. and ~5 hrs. After filtration and light material removal, the product had amine content of 1.8 meq/g for primary and 2.1 meq/g for secondary amine.

EXAMPLE 5

This example will illustrate the preparation of a typical blocked isocyanate prepolymer.

Into a 2 liter, four-necked flask equipped with a stirrer, thermometer, water condenser, dropping funnel and nitrogen source were charged 1000 g of MONDUR® CB-601 PMA (an isocyanate prepolymer supplied by Mobay Chemical Co. which contained 2.4% free isocyanate). Methyl ethyl ketone oxime (222.2g) was then added dropwise over a 1.1 hour period. The temperature rose to 68° C. during that period. After an additional 1.0 hour digestion period, the material was diluted with 135.9g ethylene glycol monoethyl ether acetate. Basis available isocyanate, the product had an equivalent weight of 543.

EXAMPLE 6

This example will demonstrate the use of the N,N'-diisopropyl derivative of JEFFAMINE® EDR-148, described in Example 1 (product 2) as a curing agent for the blocked isocyanate prepolymer described in Example 5. It will further show the improved properties of a heat cured coating made using this material, as well as the improved storage stability of the uncured coating, as compared with those made from JEFFAMINE EDR-148 amine.

Formulations, film properties and storage stability are shown in Table I.

TABLE I

| Coating No. | 6276-67A | 6276-68A |
|---|---|---|
| Formulation, pbw | | |
| Blocked isocyanate of Ex. 5 (e.w. 543) | 75 | 75 |
| N,N'—diisopropyl EDR-148 of Ex. 1 | 16.02 | — |
| JEFFAMINE ® EDR-148 | — | 10.2 |
| Film Preparation | | |
| Wet film thickness, mil | 5 | 5 |
| Cure temperature, °C. | 100–105 | 100–105 |
| Cure time, hr | 0.5 | 0.5 |
| Film Properties | | |
| Pencil hardness | F | Films opaque with many surface bubbles |
| Impact resistance, in/lb | | |
| Forward | Pass 10 | |
| Reverse | Pass <10 | |
| Storage Stability | | |
| Viscosity, 77° F., cps (days) | 1550 (initial) | 1680 (initial) |
| | 1950 (1) | 3550 (1) |
| | 4460 (6) | 32000 (5) |
| | 15400 (14) | Phase separated and gelled (7) |
| | 50300 (21) | |
| | 190000 (28) | |

EXAMPLE 7

This example will show the use of the N,N'-diisopropyl JEFFAMINE EDR-192 in blocked isocyanate coatings. It will further show the improved properties and storage stability of the uncured coatings as compared to those made from JEFFAMINE EDR-192 amine.

Formulations, details of preparation and properties are shown in Table II.

TABLE II

| Coating No. | 6276-67B | 6276-68B |
|---|---|---|
| Formulation, pbw | | |
| Blocked isocyanate of Ex. 5 (e.w. 543) | 75 | 75 |
| N,N'—diisopropyl EDR-192 of Ex. 2 | 19.68 | — |
| JEFFAMINE ® EDR-192 | — | 13.25 |
| Film Preparation | | |
| Wet film thickness, mil | 5 | 5 |
| Cure temperature, °C. | 100–105 | 100–105 |
| Cure time, hr | 0.5 | 0.5 |
| Film Properties | | |
| Pencil hardness | F | Films opaque with many bubbles |
| Impact resistance, in/lb | | |
| Forward | Pass 20 | |
| Reverse | Pass <10 | |
| Storage Stability | | |
| Viscosity, 77° F., cps (days) | 1220 (initial) | 1450 (initial) |
| | 1520 (1) | 3050 (1) |
| | 3400 (6) | 22750 (5) |
| | 11000 (14) | Phase separated and gelled (7) |
| | 30000 (21) | |
| | 86000 (28) | |

EXAMPLE 8

This example will show the use of the hydrogenated JEFFAMINE® D-230/acetone and JEFFAMINE D-400/acetone mixtures of Examples 3 and 4 as curing agents for blocked isocyanate coatings. The degree of alkylation of these materials was 61.7 and 53.8%, respectively.

Formulations, details of preparation and coating properties are shown in Table III.

TABLE III

| Coating No. | 6276-72A | 6276-72B |
|---|---|---|
| Formulation, pbw | | |
| Blocked isocyanate of Ex. 5 (e.w. 543) | 75 | 75 |
| JEFFAMINE ® D-230/acetone + hydrogen product of Example 3 | 21.1 | — |
| JEFFAMINE D-400/acetone + hydrogen product of Example 4 | — | 35.4 |
| Beetle resin | 1.4 | 1.4 |
| Film Preparation | | |
| Wet film thickness, mil | 5 | 5 |
| Cure temperature, °C. | 105–110 | 105–110 |
| Cure time, hr | 0.5 | 0.5 |
| Film Properties | | |
| Pencil hardness | F | HB |
| Impact resistance, in/lb | | |
| Forward | Pass 10 | 40 |
| Reverse | Pass <5 | 20 |
| Storage Stability | | |
| Viscosity, 77° F., cps (days) | 1960 (initial) | 1406 (1) |
| | 3410 (3) | — |
| | 8000 (8) | 5050 (8) |
| | 44200 (21) | 23000 (21) |

I claim:

1. A heat curable polyurethane coating comprising a blocked isocyanate and a curing agent comprising an N,N'-dialkyl substituted polyoxyalkylene amine having 50 to 100% of its amine groups substituted to secondary amines.

2. A heat curable polyurethane coating as in claim 1 wherein the curing agent comprises an N,N'-dialkyl substituted polyoxyalkylene amine of about 200 to 400 molecular weight with a functionality of about 2 to 3 having 50 to 100% of its amine groups substituted to secondary amines.

3. A heat curable polyurethane coating as in claim 1 wherein the curing agent comprises an N,N'-dialkyl substituted polyoxyalkylene amine of the general formula:

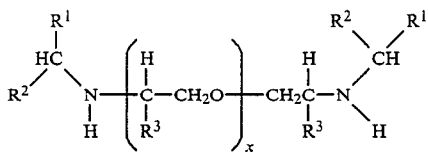

$R^1 = CH_3$, $C_2H_5$; $R^2 = CH_3$, $C_2H_5$; $R^3 = H$, $CH_3$; $x = 1-35$ and wherein 50 to 100% of the amine groups are substituted to secondary amines.

4. A method for curing a blocked isocyanate which comprises mixing the blocked isocyanate with a curing agent comprising an N,N-dialkyl substituted polyoxyalkylene amine having 50 to 100% of its amine groups substituted to secondary amines.

5. A method for curing a blocked isocyanate which comprises mixing a blocked isocyanate with an N,N-dialkyl substituted polyoxyalkylene amine of about 200 to 400 molecular with a functionality of about 2 to 3 having 50 to 100% of its amine groups substituted to secondary amines.

6. A method for curing a blocked isocyanate which comprises mixing a blocked isocyanate with an N,N-dialkyl substituted polyoxyalkylene amine of the general formula:

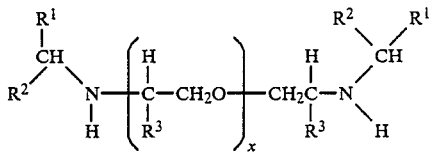

$R^1 = CH_3$, $C_2H_5$; $R^2 = CH_3$, $C_2H_5$; $R^3 = H$, $CH_3$; $x = 1-35$ and wherein 50 to 100% of the amine groups are substituted to secondary amines.

* * * * *